(12) United States Patent
Choi et al.

(10) Patent No.: US 11,897,451 B2
(45) Date of Patent: Feb. 13, 2024

(54) VEHICLE CONTROL APPARATUS, VEHICLE CONTROL METHOD THEREOF, AND VEHICLE CONTROL SYSTEM

(71) Applicant: HL MANDO CORPORATION, Pyeongtaek-si (KR)

(72) Inventors: Yunsun Choi, Seoul (KR); Minsang Seong, Yongin-si (KR); Yongjoon Lee, Suwon-si (KR); Jaegon Lee, Seongnam-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 63 days.

(21) Appl. No.: 16/944,320

(22) Filed: Jul. 31, 2020

(65) Prior Publication Data
US 2021/0031752 A1 Feb. 4, 2021

(30) Foreign Application Priority Data
Aug. 2, 2019 (KR) .......................... 10-2019-0094313

(51) Int. Cl.
| | | |
|---|---|---|
| *B60W 30/045* | (2012.01) | |
| *B60W 30/02* | (2012.01) | |
| *B60W 40/103* | (2012.01) | |
| *B60W 40/105* | (2012.01) | |
| *B60W 30/14* | (2006.01) | |

(52) U.S. Cl.
CPC ........ *B60W 30/045* (2013.01); *B60W 30/025* (2013.01); *B60W 30/146* (2013.01); *B60W 40/103* (2013.01); *B60W 40/105* (2013.01)

(58) Field of Classification Search
CPC ............. B60W 30/045; B60W 30/025; B60W 30/146; B60W 40/103; B60W 40/105
See application file for complete search history.

(56) References Cited

U.S. PATENT DOCUMENTS

| | | | |
|---|---|---|---|
| 9,147,296 B2* | 9/2015 | Ricci .................... | G06Q 20/384 |
| 10,126,749 B2* | 11/2018 | Rander .............. | G05D 23/1905 |
| 10,225,350 B2* | 3/2019 | Penilla ................. | G06Q 20/308 |
| 2010/0114445 A1* | 5/2010 | Groult ................. | B60W 40/105 |
| | | | 367/93 |

(Continued)

FOREIGN PATENT DOCUMENTS

| | | | |
|---|---|---|---|
| KR | 101131043 B1 * | 3/2012 | |
| KR | 10-2019-0052407 A | 5/2019 | |

OTHER PUBLICATIONS

Machine translation of KR101131043, 2012 (Year: 2012).*

(Continued)

*Primary Examiner* — Jeff A Burke
*Assistant Examiner* — Mohamad O El Sayah
(74) *Attorney, Agent, or Firm* — Hauptman Ham, LLP (57) ABSTRACT

Provided is an apparatus for controlling a vehicle, the apparatus including: a communicator configured to receive a setting value signal related to at least one of a first setting value, a second setting value, or a third setting value that are set in advance from a user terminal, and transmit a signal to the user terminal; and a controller configured to control at least one of a travelling device, a braking device, or a steering device based on the at least one of the first setting value, the second setting value, or the third setting value that are set in advance.

14 Claims, 6 Drawing Sheets

(56) References Cited

U.S. PATENT DOCUMENTS

| | | | | |
|---|---|---|---|---|
| 2011/0004385 A1* | 1/2011 | Ishimoto | ............... | B60T 7/12 |
| | | | | 188/106 F |
| 2017/0247023 A1* | 8/2017 | Owen | ............... | B60T 8/1766 |
| 2019/0031187 A1* | 1/2019 | Noguerol | ............ | H04L 67/1097 |
| 2019/0368601 A1* | 12/2019 | Jacobs | ............... | F16H 61/0059 |
| 2019/0375412 A1* | 12/2019 | Ishioka | ............ | B60W 30/18163 |
| 2020/0331475 A1* | 10/2020 | Zhang | ............... | B60Q 1/44 |
| 2021/0347359 A1* | 11/2021 | Nakatsuji | ............ | B60W 10/04 |

OTHER PUBLICATIONS

[Supportive Materials for Exception to Loss of Novelty] Mando Corporation, "Electronic control suspension tuning system using mobile", Oct. 23, 2018.

* cited by examiner

VEHICLE CONTROL APPARATUS, VEHICLE CONTROL METHOD THEREOF, AND VEHICLE CONTROL SYSTEM

CROSS-REFERENCE TO RELATED APPLICATION

This application is based on and claims priority under 35 U.S.C. § 119 to Korean Patent Application No. 10-2019-0094313, filed on Aug. 2, 2019 in the Korean Intellectual Property Office, the disclosure of which is incorporated herein by reference.

BACKGROUND

1. Field

The present disclosure relates to a vehicle control apparatus, a vehicle control method thereof, and a vehicle control system, and more specifically, to control of a suspension of a vehicle through a user terminal.

2. Description of the Related Art

In general, vehicle suspension control is performed in order to maintain an improved riding comfort of an occupants of a vehicle. The suspension control is required at different conditions and degrees according to occupants or user of the vehicle.

However, the conventional vehicle suspension control relies on the basic setting value, and even if the user has set a vehicle suspension setting value, the vehicle suspension setting needs to be performed again in response to another user boarding the vehicle to perform suspension control for the other user.

SUMMARY

Therefore, it is an object of the disclosure to provide a vehicle control apparatus that allows a vehicle suspension setting value to be stored in a user terminal and controls vehicle suspension based on the stored setting value.

Therefore, it is another object of the disclosure to provide a vehicle control system and a vehicle control method that are capable of changing and tuning a basic vehicle suspension setting value through a user terminal.

Additional aspects of the disclosure will be set forth in part in the description which follows and, in part, will be obvious from the description, or may be learned by practice of the disclosure.

Therefore, it is an aspect of the disclosure to provide an apparatus for controlling a vehicle, the apparatus including: a communicator configured to receive a setting value signal related to at least one of a first setting value, a second setting value, or a third setting value set in advance from a user terminal, and transmit a signal to the user terminal; and a controller configured to control at least one of a travelling device, a braking device, or a steering device based on the at least one of the first setting value, the second setting value, or the third setting value set in advance.

The apparatus may further include a determiner configured to determine user information, wherein the communicator may receive the user information, and the controller may control the determiner to perform user authentication based on the user information.

The controller may control a sensitivity of the steering device.

The controller may determine a speed of the vehicle, and may control the at least one of the travelling device, the braking device, or the steering device to absorb a shock applied to the vehicle based on a result of the determination.

The apparatus may further include an input configured to receive a signal for changing the at least one of the first setting value, the second setting value, or the third setting value from the user, wherein the controller may control the at least one of the travelling device, the braking device, or the steering device based on the changing signal.

The controller may control the at least one of the travelling device, the braking device, or the steering device of the vehicle for the vehicle to maintain a preset posture.

The controller may determine whether to change steering of the vehicle, and control the at least one of the travelling device, the steering device, or the braking device for the vehicle to be kept horizontal based on a result of the determination.

The apparatus may further include a sensor configured to detect a state of a road surface on which the vehicle travels, wherein the controller may control the at least one of the travelling device, the steering device, or the braking device to prevent a slip of the vehicle based on a result of the detection.

The controller may determine whether the vehicle performs a sudden braking, and may adjust a hydraulic pressure of the braking device to apply a brake pressure to the braking device based on a result of the determination.

The controller may determine whether the braking device has generated a braking force sufficient to stop the vehicle within a preset sudden braking distance, and may allow an additional pressure to be applied the braking device to minimize a braking distance of the vehicle based on a result of the determination.

It is another aspect of the disclosure to provide a method of controlling a vehicle, the method including: receiving a setting value signal related to at least one of a first setting value, a second setting value, or a third setting value that are set in advance from a user terminal, and transmitting a signal to the user terminal; and controlling at least one of a travelling device, a braking device, or a steering device based on the at least one of the first setting value, the second setting value, or the third setting value that are set in advance.

The method may further include determining user information, wherein the receiving may include receiving the user information, and the controlling may include performing user authentication based on the user information.

The controlling may include controlling a sensitivity of the steering device.

The controlling may include determining a speed of the vehicle, and controlling the at least one of the travelling device, the braking device, or the steering device to absorb a shock applied to the vehicle based on a result of the determination.

The method may further include receiving a signal for changing the at least one of the first setting value, the second setting value, or the third setting value from the user, wherein the controlling may include controlling the at least one of the travelling device, the braking device, or the steering device based on the changing signal.

The controlling may include controlling the at least one of the travelling device, the braking device, or the steering device of the vehicle for the vehicle to maintain a preset posture.

The controlling may include determining whether to change steering of the vehicle, and controlling the at least one of the travelling device, the steering device, or the braking device for the vehicle to be kept horizontal based on a result of the determination.

The method may further include detecting a state of a road surface on which the vehicle travels, wherein the controlling may include controlling the at least one of the travelling device, the steering device, or the braking device to prevent a slip of the vehicle based on a result of the detection.

The controlling may include determining whether the vehicle performs a sudden braking, and adjusting a hydraulic pressure of the braking device to apply a brake pressure to the braking device based on a result of the determination.

The controlling may include determining whether the braking device has generated a braking force sufficient to stop the vehicle within a preset sudden braking distance, and allowing an additional pressure to be applied the braking device to minimize a braking distance of the vehicle based on a result of the determination.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Like numerals refer to like elements throughout the specification. Not all elements of embodiments of the present disclosure will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

In the description of an embodiment, it will be understood that, when a layer is referred to as being "on/under" another layer or substrate, it may be directly on/under the other layer or substrate, or one or more intervening layers may also be present.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the operating principles and embodiments of the present disclosure will be described with reference to the accompanying drawings.

Figure 1:
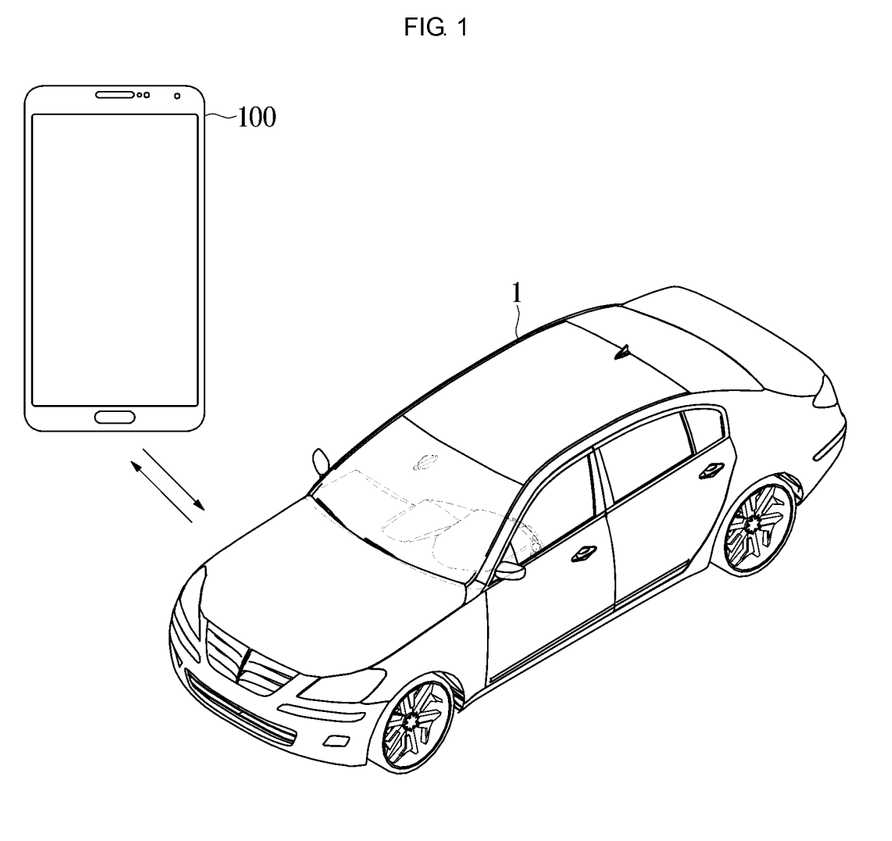
FIG. 1 shows a vehicle control system according to one disclosed aspect.
Figure 2:
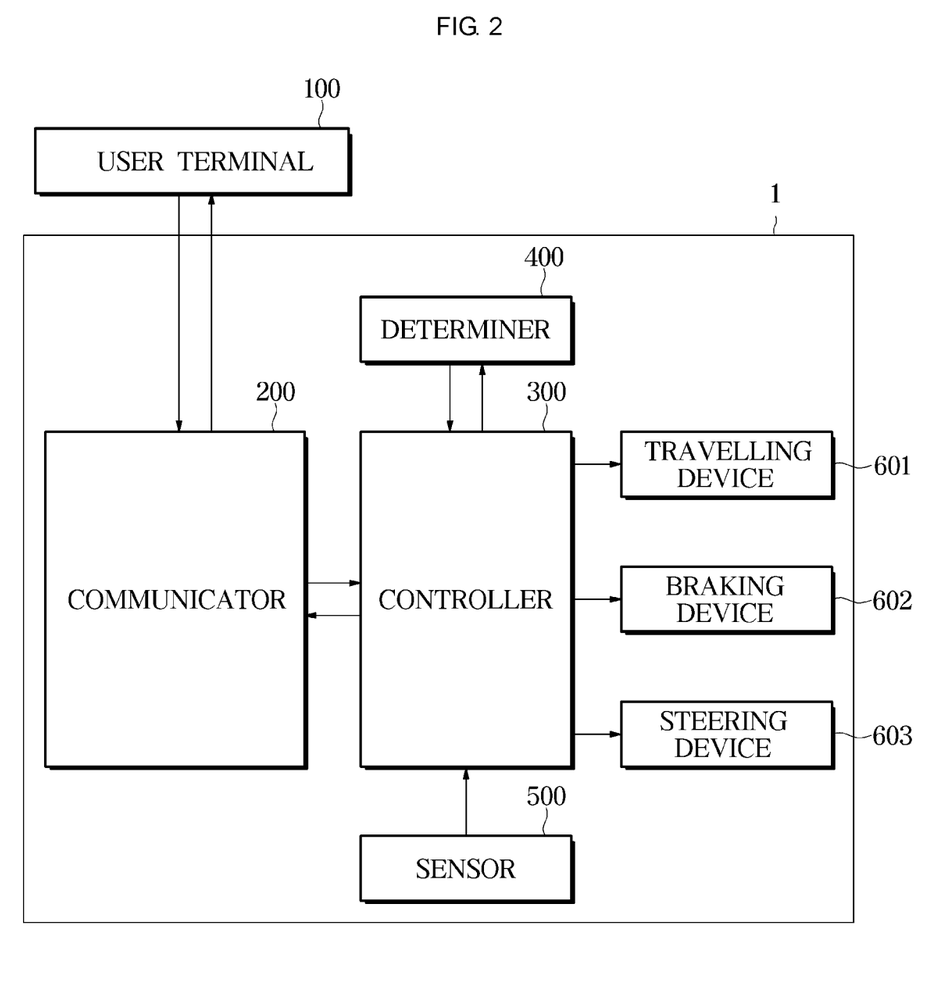
FIG. 2 is a control block diagram illustrating a vehicle control system according to one disclosed aspect.

FIGS. 1 and 2 show a vehicle control system according to one disclosed aspect.

Referring to FIGS. 1 and 2, the vehicle control system includes a vehicle 1 and a user terminal 100.

The vehicle 1 according to the disclosed aspect includes a traveling device 601 including an engine and a transmission, a braking device 602, and a steering device 603. In this regard, the traveling device 601, the braking device 602, and the steering device 603 will be described below in detail.

The vehicle 1 may include a plurality of electronic components. For example, the vehicle 1 includes an engine management system (EMS), a transmission control unit (TCU), an electronic brake control module (EBCM), an electronic power steering (EPS), a body control module (BCM), and a driver assistance system (DAS).

The DAS may assist the driver in manipulating (driving, braking, and steering) the vehicle 1. For example, the DAS may detect a surrounding environment of the vehicle 1 (e.g., another vehicle, a pedestrian, a cyclist, a lane, a road sign, and the like), and control driving and/or braking and/or steering of the vehicle 1 in response to the detected environment.

The DAS may provide the driver with various functions. For example, the DAS may include a lane departure warning (LDW), a lane keeping assist (LKA), a high beam assist (HBA), an autonomous emergency braking (AEB), a traffic sign recognition (TSR), a smart cruise control (SCC), a blind spot detection (BSD), and the like.

The DAS includes a camera module that acquires image data of the surrounding of the vehicle 1 and a radar module 102 that acquires object data of the surrounding of the vehicle 1. The camera module may include a camera and an electronic control unit (ECU), and photograph the front of the vehicle 1 and recognize another vehicle, a pedestrian, a cyclist, a lane, a road sign, and the like. The radar module may include a radar and an ECU, and acquire a relative position, a relative velocity, and the like of an object around the vehicle 1 (e.g., another vehicle, a pedestrian, a cyclists, and the like).

The DAS is not limited to that illustrated in FIGS. 1 and 2, and may further include a lidar that scans the surrounding of the vehicle 1 and detects objects.

The above described electronic components may communicate with each other through vehicle communication network NT. For example, machine parts may exchange data with each other through Ethernet, media oriented systems transport (MOST), Flexray, controller area network (CAN), local interconnect network (LIN), and the like. For example, the DAS may transmit a driving control signal, a braking signal, and a steering signal to the EMS, the EBCM, and the EPS, respectively.

The user terminal 100 according to the disclosed aspect includes a recording medium 101. The user terminal 100 may store a program for tuning a user setting value related to vehicle suspension through the recording medium 101 and store at least one of a first setting value, a second setting value, or a third setting value input from the user.

Here, the first setting value is a setting value for setting suspension related to a travelling device of the vehicle 1, the second setting value is a setting value for setting suspension related to a braking device of the vehicle 1, and the third setting value is a setting value for setting suspension related to a steering device.

The user terminal 100 may be implemented as a computer or a portable terminal that may access a device through a network, and may exchange signals with a communicator 200 provided in the vehicle 1.

Here, the computer may include, for example, a notebook computer, a desktop computer, a laptop PC, a tablet PC, a slate PC, and the like, each of which is equipped with a WEB Browser. The portable terminal is a wireless communication device mobility, and may include: all types of handheld based wireless communication devices, such as a personal communication system (PCS), a global system for mobile communications (GSM), a personal digital cellular (PDC), a personal handyphone system (PHS), a personal digital assistant (PDA), an international mobile telecommunication (IMT)-2000, a code division multiple access (CDMA)-2000, a w-code division multiple access (W-CDMA), a wireless broadband internet (WiBro) terminal, a smart Phone, and the like; and wearable devices, such as a watch, a ring, a bracelet, an anklebracelet, a necklace, glasses, a contact lens, or a head-mounted-device (HMD).

The communicator 200 according to the disclosed aspect may receive a signal related to the user setting value from the user terminal 100, and transmit a signal informing a result of controlling the vehicle to the user terminal 100 in response to the received signal.

The communicator 200 may include at least one component that enables communication with an external device, for example, at least one of a short-range communication module, a wired communication module, and a wireless communication module.

The short-range communication module may include various short-range communication modules that transmit and receive signals using a wireless communication network in a short range, such as a Bluetooth module, an infrared communication module, a radio frequency identification (RFID) communication module, a wireless local access network (WLAN) communication module, an NFC communication module, and a zigbee communication module.

The wired communication module may include various wired communication modules, such as a controller area network (CAN) communication module, a local area network (LAN) module, a wide area network (WAN) module, or a value added network communication (VAN) module, and various cable communication modules, such as a universal serial bus (USB) module, a high definition multimedia interface (HDMI) module a digital visual interface (DVI) module, a recommended standard-232 (RS-232) module, a power line communication module, or a plain old telephone service (POTS) module.

The wireless communication module may include wireless communication modules supporting various wireless communication methods, such as a Wifi module, a wireless broadband module (Wibro) module, a global system for mobile communication (GSM) module, a code division multiple access (CDMA) module, a wideband code division multiple access (WCDMA) module, a universal mobile telecommunications system (UMTS) module, a time division multiple access (TDMA) module, a long term evolution (LTE) module, and the like.

The wireless communication module may include a wireless communication interface including an antenna and a transmitter for transmitting a user setting value or a user setting value tuning signal. In addition, the wireless communication module may further include a signal converting module for converting a digital control signal output from a controller 300 through the wireless communication interface into an analog type wireless signal under the control of the controller 300.

The wireless communication module may include a wireless communication interface including an antenna and a receiver for receiving a user setting value or a user setting value tuning signal. In addition, the wireless communication module may further include a signal converting module for demodulating an analog type wireless signal received through the wireless communication interface into a digital control signal.

The controller 300 according to the disclosed embodiment may control at least one of the travelling device 601, the braking device 602, or the steering device 603 based on at least one of the first setting value, the second setting value, or the third setting value received by the communicator 200. In addition, the controller 300 according to the disclosed embodiment may control at least one of the travelling device 601, the braking device 602, or the steering device 603 based on a user setting tuning value or changing value received by the communicator 200 200. In addition, the controller 300 according to the disclosed embodiment may control at least one of the travelling device 601, the braking device 602, or the steering device 603 based on a vehicle travelling mode received by the communicator 200 200.

A determiner 400 according to the disclosed embodiment determines whether user information stored in the user terminal 100 matches preset user information. The controller 300 according to the disclosed embodiment may perform user authentication based on the determination result of the determiner 400, and when it is determined as a result of the authentication that the user information matches the preset user information, identify a condition for starting control of the vehicle.

A sensor 500 detects the state of a road surface on which the vehicle 1 travels. Specifically, the sensor 500 may detect whether the road surface is wet in the rain, covered with snow, or is dry. In addition, the sensor 500 may detect whether the road surface is paved with asphalt or is unpaved.

The sensor 500 transmits the detected state of the road surface to the controller 300, and the controller 300 may control at least one of the travelling device 601, the braking device 602, or the steering device 603 of the vehicle 1 such that that the vehicle 1 does not slip based on the result of detecting the road surface state by the sensor 500.

The traveling device 601 according to the disclosed aspect is a configuration that allows the vehicle 1 to travel. The traveling device 601 may include an engine and a transmission. The engine may include a cylinder and a piston, and generate power for the vehicle 1 to travel. The transmission may include a plurality of gears, and may transmit power generated by the engine to the wheels. In addition, the traveling device 601 may include a device that absorbs an impact applied to the vehicle 1.

In addition, the traveling device 601 may include an engine management system (EMS) or a transmission control unit (TCU).

Specifically, the EMS may control the engine in response to acceleration intent of a driver through an accelerator pedal or a request of the DAS. For example, the EMS may control the torque of the engine.

In addition, the TCU may control the transmission in response to a shift command of the driver through a shift lever and/or a travelling speed of the vehicle 1. For example, the TCU may adjust the gear ratio from the engine to the vehicle wheels.

However, the travelling device 601 is not limited thereto, and may further include a tire, a wheel control device, and the like that are required for travel of the vehicle 1.

The braking device 602 according to the disclosed aspect is a configuration to stop travel of the vehicle 1. The braking device 602 may decelerate or stop the vehicle 1 through friction with the wheels. The braking device 602 according to the disclosed aspect may include a hydraulic brake and an electronic brake control module (EBCM).

The EBCM may control the braking device in response to a braking intent of a driver through a braking pedal and/or a slip of the vehicle wheels. For example, the EBCM may temporarily release the braking of the vehicle wheel in response to a slip of the vehicle wheel being detected at a time of braking of the vehicle 1 (anti-lock braking systems, ABS). The EBCM may selectively release braking of the vehicle wheel in response to over-steering and/or under-steering being detected at a time of steering of the vehicle 1 (electronic stability control, ESC). In addition, the EBCM may temporarily brake the vehicle wheels in response to a slip of the vehicle wheel being detected at a time of driving of the vehicle 1 (traction control system, TCS).

However, the braking device 602 is not limited thereto, and may further include a tire, a wheel control device, and the like required for braking the vehicle 1, and may include a device for absorbing a shock applied to the vehicle 1.

The steering device 603 according to the disclosed aspect changes the steering of the vehicle 1. The steering device 603 may include an electronic power steering (EPS) device or a body control module (BCM).

Specifically, the EPS may assist the operation of the steering device so that the driver easily manipulates the steering wheel in response to a steering intent of the driver through the steering wheel. For example, the EPS may assist the operation of the steering device such that the steering force is reduced during low-speed traveling or parking and is increased during high-speed traveling.

The BCM may control the operation of the electronic components that provide convenience to the driver or ensure the safety of the driver. For example, the BCM may control a head lamp, a wiper, a cluster, a multifunction switch, a turn signal, and the like.

However, the steering device 603 is not limited thereto, and may further include a device required for steering the vehicle 1, and may include a device that absorbs a shock applied to the vehicle 1.

At least one component may be added or omitted to correspond to the performances of the components of the vehicle control apparatus and the vehicle control system shown in FIGS. 1 and 2. In addition, the mutual positions of the components may be changed to correspond to the performance or structure of the system.

Meanwhile, the components shown in FIGS. 1 and 2 may refer to a software component and/or a hardware component, such as a Field Programmable Gate Array (FPGA) and an Application Specific Integrated Circuit (ASIC).

Hereinafter, a process of controlling at least one of the traveling device 601, the braking device 602, or the steering device 603 of the vehicle 1 by the controller 300 will be described.

Figure 3:
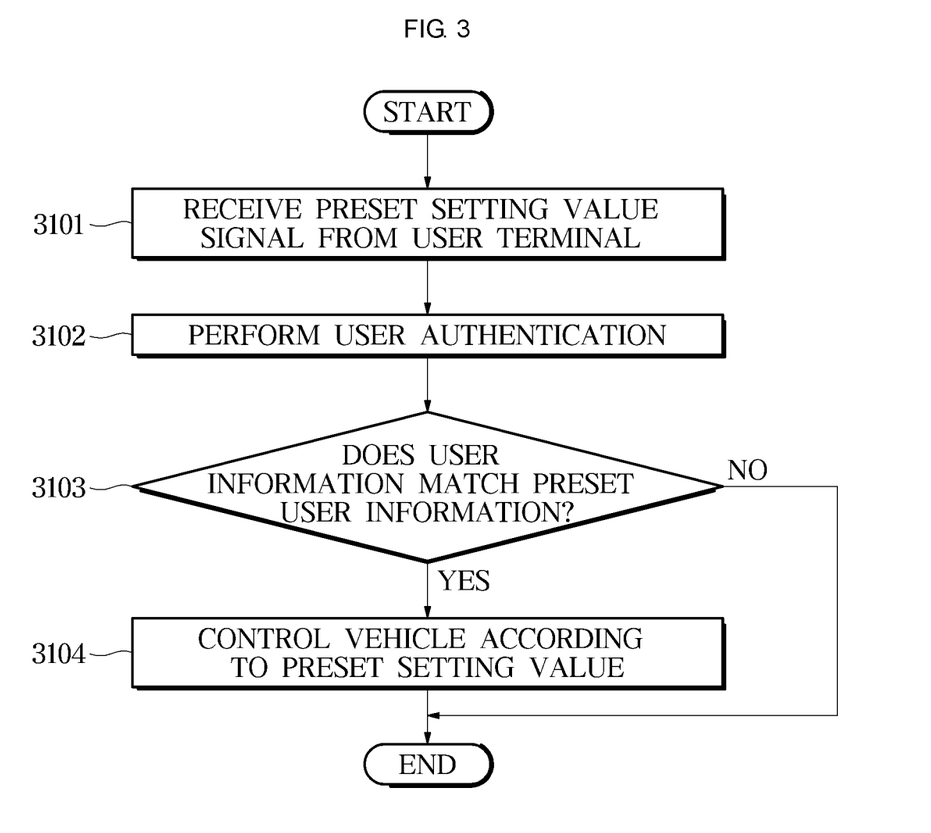
FIG. 3 is a control flowchart showing control of a vehicle according to one disclosed aspect.

FIG. 3 illustrates a process of controlling the vehicle 1 by the controller 300 according to a preset setting value.

Referring to FIG. 3, the communicator 200 receives a preset value signal from the user terminal 100, and transmits the preset setting value signal to the controller 300 (3101).

Specifically, the preset setting value signal may include a first setting value that sets a suspension condition of the traveling device 601 of the vehicle 1, a second setting value that sets a suspension condition of the braking device 602 of the vehicle 1, and a third setting value that sets a suspension conditions of the steering device 603 of the vehicle 1.

Here, the suspension condition may include a rigid axle suspension condition, a leaf spring suspension condition, a long taper suspension condition, a trailing arm suspension condition, a torsion beam suspension condition, a semi-trailing arm suspension condition, a double wishbone suspension condition, a McPherson strut suspension condition, a multi-link suspension condition, or an air suspension condition. However, the suspension condition is not limited thereto, and may include other suspension conditions as long as they can adjust the ride comfort of the vehicle 1.

In addition, the suspension device includes a coil spring and a hydraulic cylinder. However, the suspension device is not limited thereto, and may include another suspension device capable of adjusting the ride comfort of the vehicle 1.

The determiner 400 determines whether user information received from the user terminal matches user information of the vehicle 1 based on preset user information, and the controller 300 performs user authentication based on the determination result of the determiner 400 (3102).

Specifically, the user information may be biometric information of a user or an identification (ID) and a password of a user. Recognizing biometric information of the user may include recognizing a speech of the user, recognizing a fingerprint of the user, recognizing a face of the user, or recognizing an iris of the user. However, the user information is not limited thereto, and may include other pieces of information for identifying the user.

If it is determined that the user information matches the preset user information, the controller 300 controls the vehicle 1 according to the preset setting value (3103 and 3104). However, if it is not determined that the user information matches the preset user information, the controller 300 determines that the user authentication has failed, and ends the control of the vehicle 1 (3103). When the control of the vehicle 1 ends, the vehicle 1 according to the disclosure maintains a basic suspension setting value.

Here, the controller 300 may determine the speed of the vehicle 1, and control at least one of the travelling device 601, the braking device 602, or the steering device 603 to absorb a shock applied to the vehicle 1 based on the determination result.

Figure 4:
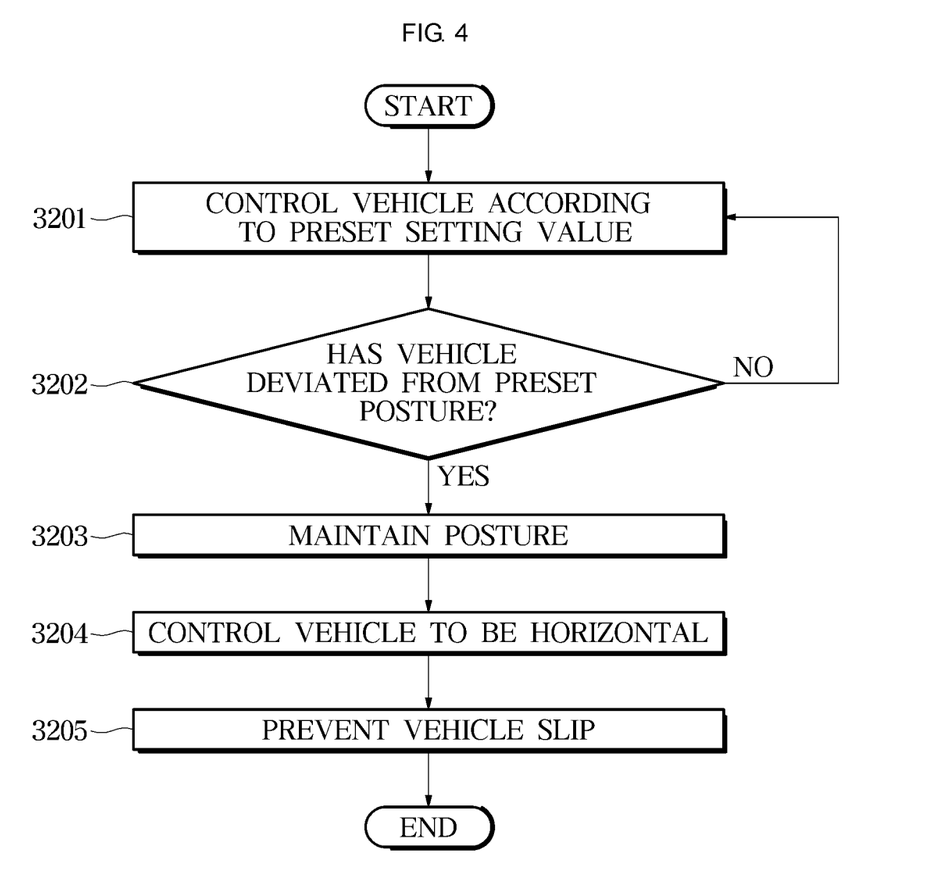
FIG. 4 is a control flowchart showing an operation of controlling a vehicle to maintain a vehicle posture stored in a setting value according to one disclosed aspect.

FIG. 4 illustrates a process of maintaining the posture of the vehicle 1 and preventing a slip by the controller 300.

Referring to FIG. 4, the controller 300 controls the vehicle 1 according to the preset setting value (3201). As described above, the preset setting value may include a first setting value that sets a suspension condition of the traveling device

601 of the vehicle 1, a second setting value that sets a suspension condition of the braking device 602 of the vehicle 1, and a third setting value that sets a suspension condition of the steering device 603 of the vehicle 1.

The controller 300 according to the disclosed aspect determines whether the vehicle 1 has deviated from a preset posture (3202).

Specifically, when it is determined that the vehicle 1 has deviated from the preset posture, the controller 300 may control at least one of the traveling device 601, the braking device 602, or the steering device 603 such that the vehicle 1 maintains the posture (3203). However, if it is determined that the vehicle 1 maintains the preset posture, the controller 300 continues to control the vehicle 1 according to the preset value (3202).

According to one disclosed embodiment, the posture of the vehicle 1 may include the height of the vehicle 1, the left and right horizontal tilt of the vehicle 1, or the front and rear horizontal tilt of the vehicle 1.

In addition, the vehicle control apparatus according to the disclosed embodiment may include a horizontal sensor that determines the horizontality of the vehicle 1, and the controller 300 may determine whether the vehicle 1 is steered, and control at least one of the travelling device 601, the braking device 602, or the steering device 603 in order for the vehicle 1 to maintain the horizontal posture (3204).

In addition, a vehicle control apparatus according to another disclosed embodiment may further include a sensor 500 that detects a road surface on which the vehicle 1 travels, and the controller 300 may control at least one of the travelling device 601, the braking device 602, or the steering device 603 to prevent a slip of the vehicle 1 based on the detection result of the sensor 500 (3205).

Specifically, the controller 300 may determine whether the detected road surface is wet in the rain, covered with snow, or dry. In addition, the controller 300 may determine whether the detected road surface is formed of asphalt, cement, or is unpaved. However, the state of the road surface to be determined by the controller 300 is not limited thereto, and may include a state of a road surface on which the vehicle 1 travels associated with weather or material of a road.

Figure 5:
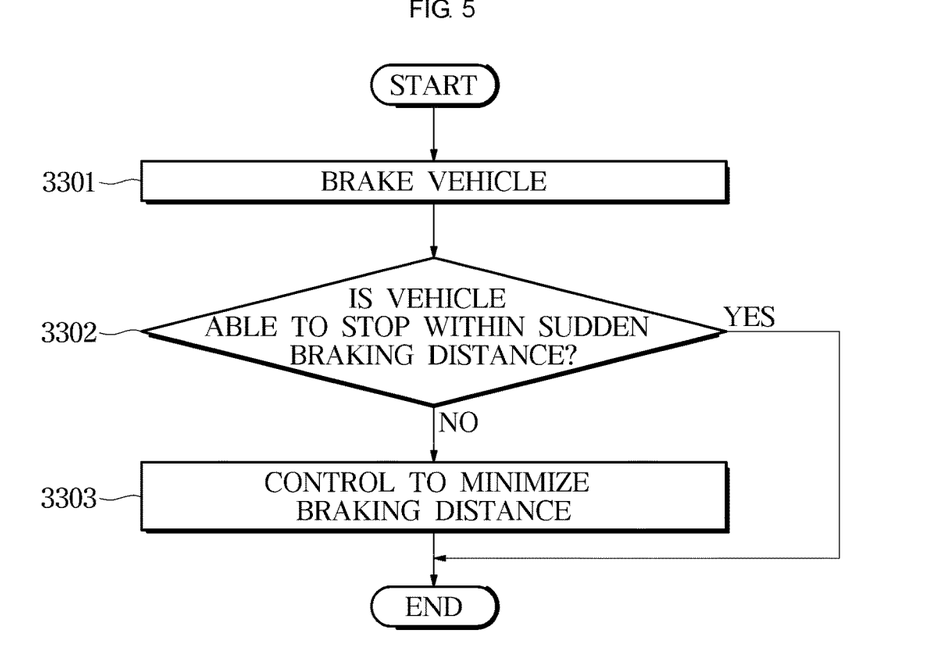
FIG. 5 is a flowchart showing a sequence of control to minimize a braking distance while braking according to one aspect disclosed.

FIG. 5 is a control flow chart showing a process of controlling at least one of the traveling device 601, the braking device 602, or the steering device 603 by the controller 300 to minimize a braking distance of the vehicle 1 at a time of sudden braking of the vehicle 1 according to the disclosed aspect.

Referring to FIG. 5, the controller 300 according to the disclosed aspect determines whether the vehicle 1 is in a braking (3301).

If it is determined that the vehicle 1 is braking, the controller 300 determines whether the vehicle 1 is able to stop within a sudden braking distance (3302).

Specifically, the sudden braking distance refers to a distance at which the vehicle 1 may stop while maintaining a posture based on a preset setting value. The sudden braking distance may be calculated based on the first setting value, the second setting value, or the third setting value. However, the sudden braking distance is not limited thereto, and may be changed by the user.

If it is determined that the vehicle 1 is able to stop within the sudden braking distance, the controller 300 ends the vehicle braking control (3302). When the vehicle braking control ends, the vehicle 1 maintains the suspension control based on the preset setting value.

However, if it is determined that the vehicle 1 is unable to stop within the sudden braking distance, the controller 300 performs control to minimize the braking distance (3303). When the braking distance is minimized, the controller 300 controls the braking device 602 or the steering device 603 to stop the vehicle 1 regardless of the first preset value, the second setting value, or the third setting value set in advance.

Figure 6:
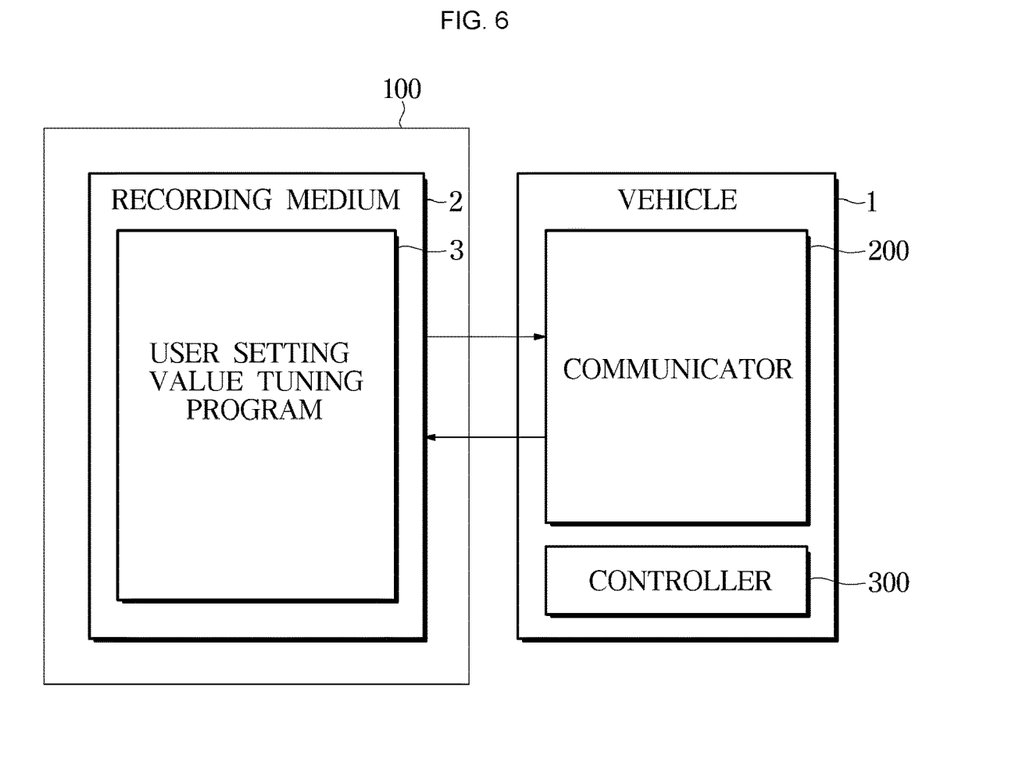
FIG. 6 is a conceptual diagram illustrating a vehicle control system according to one disclosed aspect.

FIG. 6 is a conceptual diagram illustrating a vehicle control system according to one disclosed aspect.

Referring to FIG. 6, the vehicle control system includes a user terminal 100 including a recording medium 2 and a vehicle 1 including a communicator 200 to communicate with the user terminal 100 and a controller 300 to control the vehicle 1.

According to one disclosed aspect, the recording medium 2 may store a program for tuning a user setting value, and may store the first setting value, the second setting value, or the third setting value.

Specifically, according to the program for tuning the user setting value, the user may change at least one of the first setting value, the second setting value, or the third setting value set in advance. When the user changes at least one of the first setting value, the second setting value, or the third setting value set in advance, the user terminal transmits the changed setting value to the communicator 200, and the communicator 200 200 transmits the changed setting value to an inputter (not shown). If it is determined that at least one of the first setting value, the second setting value, or the third setting value has been changed, the controller 300 controls at least one of the travelling device 601, the braking device 602, or the steering device 603 based on the changed setting value.

In addition, the recording medium 2 according to the disclosed aspect may change and store user information according to the program for tuning the user setting value.

In addition, the recording medium 2 according to the disclosed aspect may set or change a travelling mode of the vehicle 1 according to the program for tuning the user setting value, and store the set or changed travelling mode.

However, elements to be set by the user setting value tuning program stored in the recording medium 2 are not limited thereto, and may further include other elements related to the suspension of the vehicle 1.

In addition, the user setting value tuning program stored in the recording medium 2 may be provided as a mobile application.

Figure 7A:
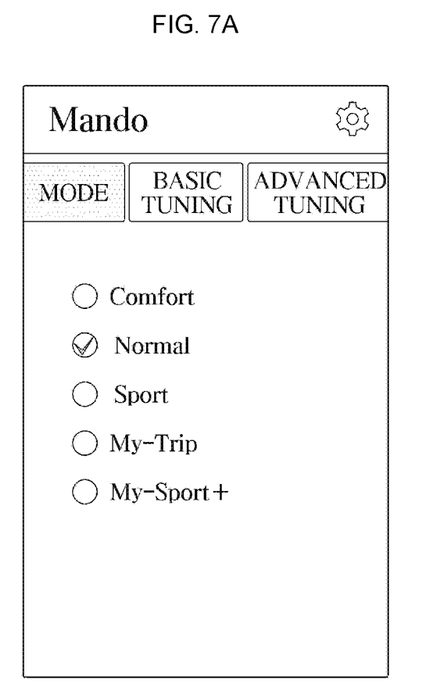
FIGS. 7A, 7B and 7C illustrate examples of a user terminal according to one disclosed aspect.
Figure 7B:
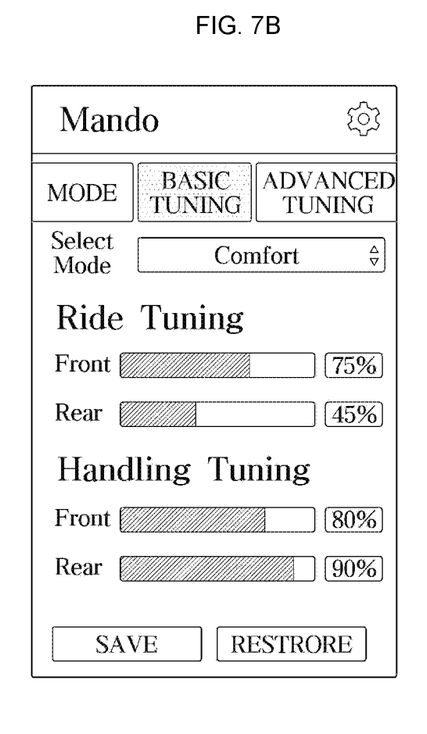
Figure 7C:
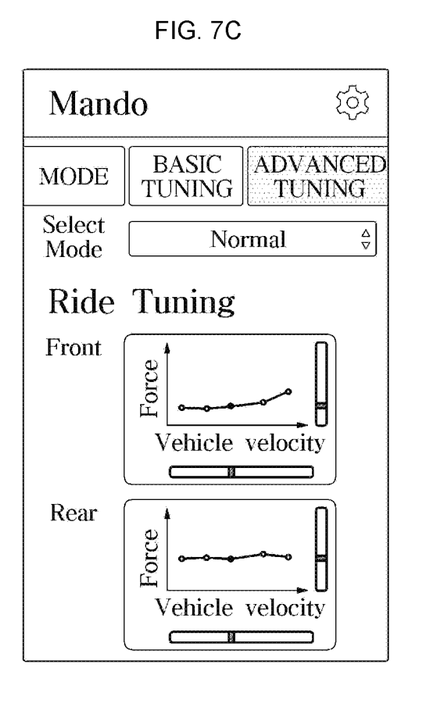

FIGS. 7A, 7B, and 7C illustrate the user terminal 100 according to one disclosed aspect.

Referring to FIG. 7A, a user may set a traveling mode of the vehicle 1 through the user terminal 100. According to the disclosed embodiment, the user may set the travelling mode of the vehicle 1 to comfort mode, normal mode, sport mode, my-trip mode, or my-sport+ mode. Here, my-trip mode or my-sport+ mode may refer a travelling mode that is set according to user definition.

Referring to FIG. 7B, the user may perform basic vehicle suspension tuning through the user terminal 100. According to the disclosed embodiment, the user may perform travelling suspension tuning (Ride Tuning) or handling tuning (Handing Tuning) through the user terminal 100.

Specifically, the travelling suspension tuning (Ride Tuning) and/or the handling tuning (Handling Tuning) may be performed separately for each of the front and the rear of the vehicle 1.

According to one disclosed embodiment, the user may store the set tuning value in the recording medium 2 or may reset the set tuning value.

According to one disclosed embodiment, the user may perform advanced suspension tuning through the user terminal 100.

Specifically, as an example of the travelling suspension tuning based on the advanced tuning, a user setting value tuning program may calculate the resistance received by the vehicle 1 due to the speed of the vehicle 1. The user may set an appropriate speed as a setting value based on the calculated resistance value, and the controller 300 may determines the speed of the vehicle 1, and control at least one of the traveling device, the braking device, or the steering device to absorb the shock or resistance applied to the vehicle 1 based on the determination result.

The vehicle control apparatus according to the disclosed embodiment performs advanced suspension tuning, thereby not only controlling suspension of the vehicle 1 but also inducing travelling to reduce a resistance applied to the vehicle 1, ultimately improving the fuel efficiency of the vehicle 1.

In addition, the advanced suspension tuning is not limited to the above-described travelling suspension tuning, and may include other tuning elements that may exert an influence on the travelling device, the braking device, or the steering device of the vehicle 1, such as handling tuning.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

As is apparent from the above, the vehicle control apparatus, the control method thereof, and the vehicle control system thereof can perform vehicle suspension control based on a setting value stored in a user terminal without needing to individually set a suspension setting value for each vehicle.

The vehicle control apparatus, the control method thereof, and the vehicle control system thereof can allow a user to randomly turn a basic suspension setting value of the vehicle, thereby providing the user with various driving feelings.

Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes.

What is claimed is:

1. An apparatus for controlling a vehicle, the apparatus comprising:
a communicator configured to receive a setting value signal related to at least one of a first setting value, a second setting value, or a third setting value that are set in advance from a user terminal, and transmit a signal to the user terminal; and
a controller configured to control at least one of a travelling device, a braking device, or a steering device based on the received setting value,
wherein the controller determines a speed of the vehicle, and controls the at least one of the travelling device, the braking device, or the steering device to absorb a shock applied to the vehicle based on the determined speed and the received setting value,
wherein the controller, when it is determined that the vehicle deviated from a preset posture, controls the at least one of the travelling device, the braking device, or the steering device based on the at least one of the first setting value, the second setting value, or the third setting value such that the vehicle maintains the preset posture,
wherein the controller determines whether the vehicle performs a sudden braking, and adjusts a hydraulic pressure of the braking device to apply a brake pressure to the braking device based on a result of the determination of performing sudden braking and the received setting value, and
wherein the controller determines, based on at least one of the first setting value, the second setting value, or the third setting value received from the user terminal, whether the vehicle is able to stop within a predetermined braking distance, and control at least one of the braking device or the steering device to minimize a braking distance of the vehicle in response to determining that the vehicle is not able to stop within the predetermined braking distance.

2. The apparatus of claim 1, further comprising a determiner configured to determine user information, wherein the communicator receives the user information, and the controller controls the determiner to perform user authentication based on the user information.

3. The apparatus of claim 1, wherein the controller controls a sensitivity of the steering device.

4. The apparatus of claim 1, further comprising an input configured to receive a signal for changing the at least one of the first setting value, the second setting value, or the third setting value from the user terminal, wherein the controller controls the at least one of the travelling device, the braking device, or the steering device based on the changing signal.

5. The apparatus of claim 1, wherein the controller determines whether to change steering of the vehicle, and controls the at least one of the travelling device, the steering device, or the braking device for the vehicle to be kept horizontal based on a result of the determination.

6. The apparatus of claim 1, further comprising a sensor configured to detect a state of a road surface on which the vehicle travels, wherein the controller controls the at least one of the travelling device, the steering device, or the braking device to prevent a slip of the vehicle based on a result of the detection.

7. The apparatus of claim 1, wherein the controller determines whether the braking device has generated a braking force sufficient to stop the vehicle within a preset sudden braking distance, and allows an additional pressure to be applied the braking device to minimize a braking distance of the vehicle based on a result of the determination.

8. A method of controlling a vehicle, the method comprising:
receiving a setting value signal related to at least one of a first setting value, a second setting value, or a third setting value that are set in advance from a user terminal, and transmitting a signal to the user terminal; and controlling at least one of a travelling device, a braking device, or a steering device based on the received setting value, wherein the controlling includes determining a speed of the vehicle, and controlling the at least one of the travelling device, the braking device, or the steering device to absorb a shock applied to the vehicle based on the determined speed and the received setting value, wherein the controlling includes, when it is determined that the vehicle deviated from a preset posture, controlling the at least one of the travelling device, the braking device, or the steering device based on the at least one of the first setting value, the second setting value, or the third setting value such that the vehicle maintains the preset posture, wherein the controlling includes determining whether the vehicle performs a sudden braking, and adjusting a hydraulic pressure of the braking device to apply a brake pressure to the braking device based on a result of the determination of performing sudden braking and the received setting value, and wherein the controlling includes determining, based on at least one of the first setting value, the second setting value, or the third setting value received from the user terminal, whether the vehicle is able to stop within a predetermined braking distance, and controlling at least one of the braking device or the steering device to minimize a braking distance of the vehicle in response to determining that the vehicle is not able to stop within the predetermined braking distance.

9. The method of claim 8, further comprising determining user information, wherein the receiving includes receiving the user information, and the controlling includes performing user authentication based on the user information.

10. The method of claim 8, wherein the controlling includes controlling a sensitivity of the steering device.

11. The method of claim 8, further comprising receiving a signal for changing the at least one of the first setting value, the second setting value, or the third setting value from the user terminal, wherein the controlling includes controlling the at least one of the travelling device, the braking device, or the steering device based on the changing signal.

12. The method of claim 8, wherein the controlling includes determining whether to change steering of the vehicle, and controlling the at least one of the travelling device, the steering device, or the braking device for the vehicle to be kept horizontal based on a result of the determination.

13. The method of claim 8, further comprising detecting a state of a road surface on which the vehicle travels, wherein the controlling includes controlling the at least one of the travelling device, the steering device, or the braking device to prevent a slip of the vehicle based on a result of the detection.

14. The method of claim 8, wherein the controlling includes determining whether the braking device has generated a braking force sufficient to stop the vehicle within a preset sudden braking distance, and allowing an additional pressure to be applied the braking device to minimize a braking distance of the vehicle based on a result of the determination.

* * * * *